United States Patent
Marchin et al.

(10) Patent No.: US 10,843,970 B2
(45) Date of Patent: Nov. 24, 2020

(54) THERMALLY INSULATING MATERIALS INCLUDING SPHERICAL, HOLLOW INORGANIC PARTICLES

(71) Applicant: PYLOTE, Dremil-lafage (FR)

(72) Inventors: Loïc Marchin, Mons (FR); Marie-Laure Desse, Portet sur Garonne (FR)

(73) Assignee: PYLOTE, Drémil-Lafage (FR)

( * ) Notice: Subject to any disclaimer, the term of this patent is extended or adjusted under 35 U.S.C. 154(b) by 95 days.

(21) Appl. No.: 15/774,537

(22) PCT Filed: Nov. 10, 2016

(86) PCT No.: PCT/FR2016/052935
§ 371 (c)(1),
(2) Date: May 8, 2018

(87) PCT Pub. No.: WO2017/081426
PCT Pub. Date: May 18, 2017

(65) Prior Publication Data
US 2019/0100464 A1    Apr. 4, 2019

(30) Foreign Application Priority Data
Nov. 12, 2015 (FR) ..................... 15 60838

(51) Int. Cl.
*C04B 35/106* (2006.01)
*B01J 13/02* (2006.01)
(Continued)

(52) U.S. Cl.
CPC ......... *C04B 35/106* (2013.01); *B01J 13/0047* (2013.01); *B01J 13/02* (2013.01);
(Continued)

(58) Field of Classification Search
CPC .............. C04B 35/106; C04B 41/4535; C04B 2235/9607; C04B 2235/5445;
(Continued)

(56) References Cited

U.S. PATENT DOCUMENTS 5,472,461 A * 12/1995 Li ........................... B24D 3/14
51/296
5,958,361 A    9/1999 Laine et al.
(Continued)

FOREIGN PATENT DOCUMENTS

| FR | 2 973 260 A1 | 10/2012 | |
| FR | 2973260 A1 * | 10/2012 | ............. B01J 13/02 |
| WO | WO 2014/160445 A1 | 10/2014 | |

OTHER PUBLICATIONS

Kim, K.D., et al. "Formation of spherical hollow silica particles from sodium silicate solution by ultrasonic spray pyrolysis method", Colloids and Surfaces. A, Physicochemical and Engineering Aspects, Elsevier, Amsterdam, NL, vol. 254, No. 1-3. Mar. 10, 2005 (Mar. 10, 2005), pp. 193-198, XP027803093, ISSN: 0927-7757.
(Continued)

*Primary Examiner* — Noah S Wiese
(74) *Attorney, Agent, or Firm* — Juneau & Mitchell IP Law Firm; William Beaumont (57) ABSTRACT

The invention concerns thermally insulating materials comprising the aforementioned particles, a process for the preparation of these particles and materials obtained by incorporation of these particles into matrices. The present invention also concerns inorganic spherical and hollow inorganic particles with low apparent density imparting thermal properties to various types of matrices in which they are dispersed.

13 Claims, 2 Drawing Sheets

(51) Int. Cl.
*B01J 13/00* (2006.01)
*C04B 41/45* (2006.01)

(52) U.S. Cl.
CPC ...... *C04B 41/4535* (2013.01); *C04B 2235/40* (2013.01); *C04B 2235/5436* (2013.01); *C04B 2235/5445* (2013.01); *C04B 2235/9607* (2013.01); *Y02A 30/261* (2018.01); *Y02B 30/94* (2013.01)

(58) Field of Classification Search
CPC .......... C04B 2235/5436; C04B 2235/40; B01J 13/0047; B01J 13/02; Y02A 30/261; Y02B 30/94
See application file for complete search history.

(56) References Cited

U.S. PATENT DOCUMENTS

| | | | | |
|---|---|---|---|---|
| 7,108,925 | B2 * | 9/2006 | Campbell | ............. C04B 35/185 428/698 |
| 2003/0207155 | A1 * | 11/2003 | Morrison | ................ B32B 18/00 428/699 |
| 2005/0064245 | A1 * | 3/2005 | Campbell | ............. C04B 35/185 428/697 |

OTHER PUBLICATIONS

Kumar Neetesh, et al.: "Synthesis of hollow CDS micro-/nanospheres by CoSP technique and their visible light photocatalytic activities", Applied Surface Science, vol. 288, Oct. 22, 2013 (Oct. 22, 2013), pp. 172-179, XP028780692, ISSN: 0169-4332, DOI: 10.1016/J.APSUSC.2013.10.003.

Hyodo T, et al. "Preparation of hollow alumina microspheres by microwave-induced plasma pyrolysis of atomized precursor solution", Journal of the European Ceramic Society, Elsevier Sciencepublishers, Barking, Essex, GB, vol. 25, No. 16, Nov. 1, 2005 (Nov. 1, 2005), pp. 3563-3572, XP02761803, ISSN: 0955-2219.

Yanjie Hu, et al.: "Preparation of hollow alumina nanospheres via surfactant-assisted flame spray pyrolysis", Particuology, Elsevier, Amsterdam, NL, vol. 9, No. 5, Jun. 20, 2011 (Jun. 20, 2011), pp. 528-532, XP028322899, ISSN: 1674-2001, DOI: 10.1016/J. Partic. 2011.06.003.

Huang Y, et al.: "Aerosol-assisted flow synthesis of B-doped, Ni-doped and Bi—N-codoped TiO2 solid and hollow microspheres for photocatalytic removal of NO", Applied Catalysis B: Environmental, Elsevier, Amsterdam, NL, vol. 89, No. 3-4, Jul. 15, 2009 (Jul. 15, 2009), pp. 398-405, XP026130179, ISSN: 0926-3373, DOI: 10.1016/J. APCATB.2008.12.020.

* cited by examiner

THERMALLY INSULATING MATERIALS INCLUDING SPHERICAL, HOLLOW INORGANIC PARTICLES

The present invention concerns materials that incorporate micrometric, spherical and hollow inorganic particles with low apparent density imparting thermal insulation properties into various types of matrices in which they are dispersed. The invention also concerns these particles, a process for the preparation of these particles and materials obtained by incorporation of these particles into matrices.

PRIOR ART

In the field of thermally insulating materials, it is common to use particles in order to impart these insulating properties to the materials. Metal oxide particles can be used as a thermal barrier and can thus be included in the composition of thermally insulating materials in various fields, such as aeronautics, aerospace, construction, automobile manufacturing, furnaces, individual fire or temperature protection systems, etc.

In the patent FR 2973260, the Applicant described a method for preparing hollow metal oxide particles. A method is proposed using the technique of aerosol pyrolysis carried out under particular conditions. During nebulisation, the liquid solution contains not only a precursor of a metal oxide in a solvent, but also a blowing agent in a sufficient amount for forming, at the time of decomposition, a single cavity that is concentrated in the center of particle. The blowing agent is preferably an organic polyacid or ethylene glycol and its derivatives. The pore size of the particles is less than a micrometer. The particles thus obtained are described as suitable for use as base components in the preparation of materials forming a thermal barrier, and in particular the production of parts for protecting aircraft engines. However, the method described requires the use of a blowing agent, which makes implementation of the method complex, in particular with derivatives of ethylene glycol which, when they decompose, can generate carbon monoxide or carbon dioxide, ketones and/or aldehydes or leave carbon-containing residue. Moreover, ethylene glycol derivatives are now known for their specific toxicity to certain target organs.

In this context, the applicant developed inorganic hollow spherical particles of low apparent density, which imparts to them extremely low intrinsic thermal conductivity, with the result that once they are dispersed in materials, they can impart satisfactory thermal insulating properties to said materials. These advantageous thermal properties are found in materials that can be used at various temperatures, in particular at outdoor or ambient temperatures (for example between −30° C. and 40° C.), as in construction, or at temperatures ranging from 80 to 500° C., as in industrial furnaces or furnaces for private use, or also furnaces usable at extreme temperatures (above 800° C., for example), such as in thermal barriers for aircraft engine turbines. The Applicant developed a simple method making it possible to prepare such inorganic particles, in particular not requiring the use of a blowing agent or sacrificial agent (or "template") decomposed by chemical means or carbonised at high temperature, thus creating an empty space in the center of the particle.

SUMMARY OF THE INVENTION

A first object of the present invention is a set of inorganic particles, characterised in that the particles are spherical, micrometric, hollow, and of low apparent density.

A second object is the use of these particles as a thermal barrier.

In particular, these particles have a highly significant thermal barrier effect and can thus make it possible to lighten the materials containing them, which can be highly advantageous in particular in the fields of aeronautics, engines, or construction.

Another object of the invention is a thermally insulating material comprising the particles of the invention dispersed in a matrix.

Another object is a process for the preparation of particles according to the invention.

Another object of the invention is a method for preparing a material according to the invention, comprising the bringing into contact of a matrix with a set of spherical, micrometric, hollow particles of low apparent density.

DETAILED DESCRIPTION OF THE INVENTION

The first object of the present invention is a material comprising inorganic particles, characterised in that the particles are spherical, micrometric, and hollow, with the powder composed of said particles having an apparent density of less than 700 kg·m$^{-3}$, and preferably 100 to 700 kg·m$^{-3}$.

Throughout the present description, the term "hollow particle" is understood to refer to a particle having a dense or slightly porous outer shell and a free volume inside said shell. These particles differ in particular from particles said to be porous, which have a plurality of pores that, although they can communicate with one another, do not form only one single and individual free volume inside the shell of the particle. The particles according to the invention are hollow, and their wall thickness can be controlled, in particular by means of the parameters of the synthesis method, and more particularly by properly setting the metal oxide precursor concentration in the initial solution. It was calculated by transmission electron microscopy that the wall of particles having diameters greater than 0.7 µm accounts for 5% to 50% of the diameter, which in particular may represent a thickness of 0.02 nm to 0.7 µm.

The powders, composed of the set of hollow particles according to the invention, have a particularly low apparent density ranging from 100 to 700 kg/m$^3$.

Apparent density, expressed in the International System of Units (SI) in kg/m$^3$, represents the mass per unit volume of the powder including the interstitial porosity of the particles. Given the hollow structure of the particles, the value of apparent density is given for powder that is "unpacked" or said to be in bulk (or "bulk density") (also referred to as apparent density) and optionally after packing (cf. Degallaix, Suzanne. Caractérisation expérimentale des matériaux: Propriétés physiques, thermiques et mécaniques (Experimental Characterisation of Materials: Physical, Thermal, and Mechanical Properties). PPUR Presses polytechniques, 2007, pp. 103-112; Haussonne, Jean-Marie. Ceramiques et verres: principes et techniques d'élaboration (Ceramics and Glasses: Production Principles and Techniques.) PPUR Presses polytechniques, 2005, pp. 73-74).

The particles according to the invention are spherical, i.e. they have a 3D sphericity or a 2D circularity greater than or equal to 0.75. Preferably, the sphericity is greater than or equal to 0.8, greater than or equal to 0.85, greater than or equal to 0.9, or greater than or equal to 0.95.

2D circularity can be calculated, for example, by measuring the aspect ratio using any suitable software based on images, for example images obtained by microscopy, in particular scanning or transmission electron microscopy, of the particles. The circularity C of a particle, in a 2D view, is the ratio:

$$C = 4\pi \frac{\text{area}}{\text{perimeter}^2}.$$

(For a perfect circle, this ratio is equal to 1) (Cavarretta, I., O'Sullivan, C., and Coop, M. R. Applying 2D shape analysis techniques to granular materials with 3D particle geometries. Powders and Grains 2009, 2009, vol. 1145, pp. 833-836.)

In an embodiment, the invention concerns a set of particles as defined above. In this embodiment, the set can optionally contain isolated particles that do not meet the required sphericity criteria, provided that the number average sphericity of the set of particles meets the criteria specified in the present invention. The term "set of spherical particles" thus refers to a plurality of particles in which at least 50% of the particles in number have a sphericity as defined above. Preferably, at least 60%, at least 70%, at least 80%, at least 90%, or at least 95% in number of the particles of the set in question have a sphericity as defined above.

In the present invention, the term inorganic particle refers to a particle composed of an inorganic product, i.e. a product not originating from carbon chemistry. The chemical diversity of inorganic particles is well known to the person skilled in the art. In particular, the inorganic particles are particles composed of a metal (or an alloy) or a metal oxide. In particular, the inorganic particles are particles of zirconium oxide (or zircon, formula $ZrO_2$), optionally with a rare earth element, particles of magnesium oxide (formula MgO), aluminum oxide (formula $Al_2O_3$), boehmite (formula AlOOH), zinc oxide (formula ZnO), in particular hexagonal ZnO, optionally doped, for example with aluminium, particles of aluminum silicate, such as mullite ($SiO_2$, $Al_2O_3$), particles of perovskite structure (based on calcium titanate, formula $CaTiO_3$), particles of mixed oxides, such as mixtures of oxides of aluminium, magnesium and/or silicon, in particular binary or ternary $Al_2O_3$—$SiO_2$—MgO (sapphirine, cordierite, spinel, etc.), or a mixture thereof.

The inorganic particles according to the invention can optionally comprise at least one dopant, such as for example aluminium, erbium, europium, ytterbium, or gadolinium. The dopant is contained in an amount of 10% by weight at most, preferably 5% by weight at most, in particular 2% by weight at most.

Of course, the particles according to the invention can contain a minimal proportion, for example less than or equal to 5% by weight, of contaminants that may be of a chemical nature different from that of said particles.

In a preferred embodiment, the inorganic particles are particles of ZnO, in particular hexagonal ZnO, optionally doped, for example with aluminium, particles of alumina, in particular amorphous, cubic or rhombohedral, particles of boehmite, in particular orthorhombic, particles of magnesium hydroxide, in particular hexagonal, particles of magnesium oxide, in particular cubic, particles of dizirconium oxide, in particular quadratic, particles of zircon stabilised with yttrium, particles of mullite, particles of $MgAl_2O_4$, or particles of $Y_3Al_5O_{12}$.

In a particular embodiment, the inorganic particles are particles of ZnO, in particular hexagonal ZnO, optionally doped, for example with aluminium, particles of alumina, in particular amorphous, cubic or rhombohedral, particles of boehmite, in particular orthorhombic, particles of magnesium hydroxide, in particular hexagonal, particles of magnesium oxide, in particular cubic, particles of zircon stabilised with yttrium, particles of $CaCu_3Ti_4O_{12}$, particles of mullite ($SiO_2$—$Al_2O_3$), particles of $MgAl_2O_4$, or particles of $Y_3Al_5O_{12}$.

In a more particular embodiment, the particles are particles of MgO, ZnO, or $ZrO_2$, optionally partially or totally stabilised with an element selected among the rare earths (in particular yttrium), mullite ($SiO_2$—$Al_2O_3$), alumina, such particles doped, or a mixture thereof. In another more particular embodiment, the particles are particles of MgO, ZnO, or $ZrO_2$, stabilised with yttrium, mullite ($SiO_2$—$Al_2O_3$), or such particles doped. In a more specific embodiment, the particles are particles of mullite.

The particles according to the invention are micrometric, i.e. the average diameter of the particles ranges from 0.1 to 10 μm. According to another particular embodiment, the diameter of the particles according to the invention ranges from 0.2 to 7 μm and preferably 0.3 to 5 μm, and preferably ranges from 0.5 to 2 μm. The person skilled in the art is familiar with suitable methods for determining the diameter of the particles or sets of particles according to the invention, and he/she is also aware of the degree of uncertainty inherent in these measurements. For example, the average diameter of the particles of a set, the standard deviation and the size distribution in particular can be determined by statistical tests based on microscopy images, for example scanning electron microscopy (SEM) or transmission electron microscopy (TEM).

In cases where the particles are in a set, the diameter values given above can correspond to the average diameter of the particles in number, even if certain particles of the set have diameters outside this range. Advantageously, all of the particles of the population have a diameter as defined above.

In an embodiment, the standard deviation relative to the size of the particles in a population of particles according to the invention is less than or equal to 50%, preferably less than or equal to 20%.

The size distribution of the particles in the set of particles according to the invention can be monomodal or multimodal.

In the present invention, the set of particles according to the invention has the advantage of comprising individualised particles, i.e. non-aggregated particles. In this manner, each particle of the set is not bonded to other particles by strong chemical bonds such as covalent bonds.

A set of particles according to the invention can optionally contain isolated particles that do not have this characteristic, provided that the criterion of non-aggregation is met in that at least 70%, at least 80%, at least 90%, or at least 95% in number of the particles of the set in question are individualised.

Preferably, a particle of the set according to the invention is not composed of an aggregation of a plurality of particles of smaller size. This can be clearly visualised, for example, by means of microscopic observation, in particular scanning or transmission electron microscopy. This means that the only possible components of the particles according to the invention are crystallites of a size markedly smaller than that of the particles according to the invention. A particle according to the invention is preferably composed of at least two crystallites. A crystallite is an area of matter having the same structure as a monocrystal, i.e. in the atomic plane defining this structure, there is no major discontinuity in the crystalline order other than isolated defects (gaps, inserted or substituted atoms) or linear defects (dislocations).

By way of comparison, the atomisation methods conventionally used in prior art generally provided aggregated non-spherical particles. The objects formed by these particle aggregates can be spherical. The particles are not perfectly spherical and can be aggregated, which is not the case with the particles of the present invention, which show a high sphericity of greater than 0.75.

Preferably, the particles according to the invention are individualised, non-deformed particles. Moreover, the surface of each particle that is optionally in contact with other particles is generally very small. In an embodiment, the radius of curvature of the meniscus forming the contact between two different particles of the set is less than 5%, preferably less than 2%, of the radius of each of the two particles, in particular in a matrix or in the form of powder.

The present invention also relates to use of the particles according to the invention as a thermal barrier. The particles according to the invention can make it possible to advantageously reduce the thermal conductivity of materials conventionally used as thermal insulators; in particular, this reduction is at least 10% and can optionally be up to 50% with respect to the thermal conductivity of materials conventionally used as thermal insulators. In this manner, and as specified above, the particles can provide the advantage of making the materials into which they are integrated lighter. For example, particles incorporated into materials for aeronautics can make it possible to lighten these thermally insulating materials and thus reduce fuel consumption and/or carbon dioxide emissions.

According to an aspect, the invention concerns a thermally insulating material comprising particles according to the invention and a matrix. More specifically, the material comprises particles dispersed in a matrix. The characteristics of the particles according to the invention make the dispersion thereof particularly homogeneous, which contributes to thermal insulation performance.

According to the present invention, the term matrix refers to any material that is used for thermal insulation and can advantageously benefit from the incorporation of the particles according to the invention. These are generally solid matrices, such as materials based on ceramics, fibers, organic foams (e.g. polymers, resins) or inorganic foams, enamel, or a mixture thereof (composite materials), generally used as thermal insulators. These matrices can be used in various industrial fields, such as aeronautics, aerospace, engines, automobile manufacturing, construction, furnaces, individual fire or temperature protection systems, etc.

According to an aspect of the invention, the materials can be insulating ceramics, also referred to as "thermal barriers", containing particles according to the invention. These materials can thus function at a higher temperature than the systems used, which are based on zircon particles partially stabilised with yttrium oxide and have a dense structure.

The material may be a composite part having a ceramic matrix obtained by infiltration of a suspension of a ceramic powder in a fibrous reinforcing material. Ceramic matrix composites (or ceramic mixed composites, also referred to as CMCs) are emergent materials showing enhanced thermomechanical properties that can be used under severe operating conditions, such as temperatures above 750° C. or 800° C., or even above 1000° C. Because of their high level of thermomechanical performance, these materials are used in particular in the production of mechanical parts, for example in the field of aeronautics or the aerospace industry, for example in engine parts, gas turbines, or combustion chambers. According to a particular embodiment, the invention concerns ceramic matrix composite materials comprising a set of particles according to the invention, and optionally a fibrous reinforcing material.

In the area of baking ovens or industrial furnaces, cavities coated with a layer of enamel are commonly used. Enamelled steel is known to be resistant to high temperatures (in general between 100 and 500° C.) and for having a heat-reflecting capacity that intrinsically allows it to be used in applications such as thermal columns and heat exchangers, furnaces, or hot gas piping.

According to a particular embodiment, the invention thus relates to a material comprising an enamel matrix and a set of particles according to the invention, and in particular particles of magnesium oxide (MgO). The standard AFNOR NF92-010 of 1977 defines enamel as being a substance resulting from the fusion or sintering of inorganic components intended to form a molten or meltable vitrified product on a metal support. The melting temperature of enamels is greater than 500° C. (932° F.).

The main component of the enamel is generally silica, in pure form or combined with feldspars, clays, and/or micas. Other components can be conventionally used in the enamel, such as refractory materials (for example alumina, $Al_2O_3$), fluxing agents, which reduce melting and firing temperatures and increase the expansion coefficient (mainly composed of borax—sodium tetraborate $Na_2B_4O_7$—in anhydrate or hydrate form, and alkaline oxides—for example oxides of sodium $Na_2O$, potassium $K_2O$, lithium $Li_2O$, calcium CaO, magnesium MgO and strontium SrO—in order to yield borosilicate salts, adhesion promoters (such as metal oxides), opacifiers or dyes. The invention can thus consist of incorporating the particles according to the invention in order to sufficiently reduce the diffusivity and/or thermal conductivity of an enamel coating on a substrate, allowing it to reduce thermal losses toward the outside of the substrate. For example, the particles of the present invention can be used in the walls of household electric ovens or industrial furnaces whose operating temperature does not exceed 400° C. More generally, limiting of thermal losses makes the power consumption of the oven or furnace more homogeneous and better optimised, thus reducing energy costs. Without limiting this to a single theory of the invention, in practice, the particles according to the invention are homogeneously distributed in the enamel layer, thus making it porous. In this case, one can speak of composite/enamel layers, because the particles are not melted at enamel vitrification temperatures below 1200° C. The particles according to the invention can be added to the slurry in an amount of between 10 and 60% by weight with respect to the dry extract. The resulting energy gain can be evaluated based on the power consumption of the oven or furnace, and in this connection, the particles according to the invention thus used can yield a gain of 5% to 30%.

This enamel-based material can therefore be used as a components of columns, heat exchangers, furnaces, or hot gas pipes. This material is generally in the form of a film or layer. This material in the form of a layer preferably has a thickness of 50 to 400 μm.

According to a particular embodiment, the solid matrix can be polymer matrix, particularly a thermoplastic polymer matrix. Among the polymer matrices that can be used according to the invention, one can mention in particular polypropylene, polyethylene, polyethylene terephthalate, polyoxymethacrylate, polyurethanes, ABS (acrylonitrile butadiene styrene), PLA (polylactic acid) or polyethylene vinyl acetate. According to a particular embodiment, the invention concerns materials comprising a polymer matrix, in particular selected among polypropylene, polyethylene, polyethylene terephthalate, polyoxymethacrylate, polyurethanes, ABS (acrylonitrile butadiene styrene) or polyethylene vinyl acetate, and a set of particles according to the invention.

In the field of construction, the thermally insulating materials most commonly used are fibrous insulators based on natural or synthetic fibers, such as glass wool or rock wool, cellular insulators of the foamed polymer type, such as polystyrene, polypropylene, polyvinyl chloride, foamed or extruded polyethylene (particularly low- or high-density polyethylene), or phenolic or polyurethane foams. Thin multilayer reflective insulators are technical complexes of low thickness composed of an assembly of reflective films and associated separators (cotton wools, foams, etc.). The function of reflective films is to reflect thermal radiation: this is the principle used in the double glazing and safety blankets used in home insulation. With equivalent thermal efficacy, thin multilayer reflective insulators allow the use of insulation devices that are 3 to 5 times thinner (including air layers) than conventional thick insulators. They are perfectly suited for the insulation of residential, commercial, and industrial buildings—in roofing, attics, walls, and floors. The performance of an insulating material is determined by its heat transfer properties by means of radiation, convection, and induction. The lower the conductivity, the better the insulation, i.e. the capacity to reduce heat transfer. Conductivity is measured by the usual laboratory methods: the insulator is placed between two environments of different temperatures in order to create a temperature differential ($\Delta T$), the amount of energy required to maintain a constant temperature on both sides of the insulator is measured, and this amount is equal to the heat flow passing through the product. From this measurement of thermal conductivity, one derives the value of thermal resistance R, which is the ratio of the thickness (e) to the thermal conductivity ($\lambda$) of an insulator, expressed in $m^2 \cdot K/W$ ($R=e/(\lambda)$). The resulting mass per unit volume of the foam depends on the extrusion conditions and the nucleating agent present. The mass per unit volume of the insulating foam is preferably less than 20 $kg/m^3$, in particular less than 17 $kg/m^3$.

In this manner, without limiting ourselves to any particular theory of the invention, it appears that use of the particles according to the invention in the context of thermal insulators for construction makes it possible to provide double porosity of two scales, one provided by the bubbles formed during "foaming" and the other by the addition of hollow particles according to the invention; as the particles are of mineral nature, they can also contribute toward formation of the foam as a passive nucleating agent. One can thus imagine that as the air contained in the hollow particles could also be released in the final stage of foam formation, the hollow particles would act as both an active and a passive agent. As the particles according to the invention are of low apparent density, this also makes the material lighter, and this can be measured by the reduction in the apparent density of the insulating foam for a given equal thickness.

The particles according to the invention can be incorporated by conventional extrusion and/or granulation methods.

According to a particular embodiment, the invention concerns thermally insulating materials for construction comprising a matrix and a set of particles according to the invention, said matrix being in particular a matrix of natural or synthetic fibers such as glass wool or rock wool or a matrix of cellular insulators of the foamed polymer type such as polystyrene, polypropylene, polyvinyl chloride, or foamed or extruded polyethylene, or a matrix of phenolic or polyurethane foams.

The incorporation of the particles according to the invention in a matrix makes it possible to impart particularly advantageous thermal properties to the matrix. Incorporation of the particles into the matrix can be carried out by the methods conventionally used in prior art, in particular by mechanical agitation in the slurry that is the precursor of the solid matrix. This can be the case in particular when the materials are ceramic matrices. A method of producing such a material comprises in particular the sintering of a slurry containing particles according to the invention and the ceramic precursors according to the methods conventionally used for ceramics. In cases where the matrix comprises fibers, the particles according to the invention can be incorporated into a composite including the fibres, as in the case of CMCs. The particles according to the invention can be incorporated by example by thoroughly mixing the fibres and the particles according to the invention in the form of a slurry alone or by impregnation of the fibres using a slurry containing the particles according to the invention. In cases where the matrix is conventionally extruded or granulated, the particles according to the invention can be incorporated into the master batch comprising the precursors of the matrix, which is then to be conventionally extruded and/or granulated.

The material comprising the particles according to the invention can in particular be in the form of powder, beads, pellets, granules, layers (or films) and/or extrudates, and any subsequent shaping operations can be carried out by the conventional methods known to the person skilled in the art.

In particular, the shaping method of the material does not require any additional step of dispersing the particles in the matrix compared to the shaping method conventionally used for matrices without incorporation of particles. The shaping method can preferably be carried out on the equipment and processing systems conventionally used for matrices that do not incorporate particles. In certain embodiments, dispersion of the particles in the matrix can be carried out without an additional chemical dispersant.

In a particular embodiment, dispersion of the particles in the matrix is carried out with or without the presence of a chemical dispersant such as a surfactant. The person skilled in the art is capable of determining whether the use of a dispersant is necessary to obtain the desired dispersion and of adjusting the amount of the dispersant used if necessary. For example, the dispersant can be used in an amount of 0.5 to 50% by weight relative to the weight of the particles, in particular in an amount of 0.5 to 20% by weight relative to the weight of the particles.

The particles according to the invention have the particular characteristic of dispersing in the matrix in an essentially homogeneous volume, regardless of their chemical nature or the nature of the matrix. This means that the number of particles per unit volume is generally the same in every location of the matrix. In the case of a solid matrix, the number of particles per unit area is preferably approximately the same regardless of the area of the matrix in question, whether this is a surface area of the matrix or an area obtained by cutting through the material, for example. In this manner, the improvement in thermal insulation achieved and imparted to the matrix by incorporating the particles according to the invention is distributed in an essentially homogeneous manner throughout the volume of the matrix.

The material according to the invention can comprise the particles according to the invention in any suitable proportion in order to impart to it the desired thermal insulating properties. For example, the material can comprise 0.1 to 80% by weight of particles with respect to the total weight of the matrix and the particles, preferably 1 to 60% by weight, in particular 2 to 25% by weight.

According to a particular embodiment, the thermally insulating material comprises particles of mullite according to the invention.

The particles and materials according to the invention can be obtained by a method such as that described below.

Another object of the present invention is a method for producing a set of particles according to the invention as described above. The method according to the invention is a method referred to as "aerosol pyrolysis" (or spray pyrolysis), which is carried out at drying temperatures rather than pyrolysis temperatures. This is an improved method with respect in particular to the method described in the application FR 2973260. More specifically, the method according to the invention does not require a blowing agent. It is generally carried out in a reactor. In this manner, the set of particles thus obtained can correspond to large amounts; more particularly, the amount obtained can be more than 100 g, 500 g, 1 kg, 15 kg, or 20 kg, with this amount varying depending on the solution feed supplied and/or desired for the reactor. The set of the particles thus obtained therefore has the advantage of having been obtained in a large amount while at the same time taking into account the characteristics of the particles described above.

This method comprises the following steps:
(1) nebulisation of a liquid solution containing a precursor of the inorganic material(s) from which one wishes to form particles at a given molar concentration in a solvent so as to obtain a fog of solution droplets,
(2) heating of the fog at a temperature (referred to as the drying temperature) capable of ensuring evaporation of the solvent in order to increase the precursor concentration of the inorganic material(s) on the periphery of the droplets and capable of ensuring the formation of particles,
(3) heating of these particles at a temperature (referred to as the pyrolysis temperature) capable of ensuring the decomposition of the precursor in order to form the inorganic material with simultaneous complete precipitation and extraction of the solvent in order to form the shell of the hollow particles,
(4) densification of the shell of the particles, and
(5) recovery of the particles thus formed.

Step (1) of nebulisation is preferably carried out at a temperature of 10 to 40° C. and/or preferably for a duration less than or equal to 10 seconds, in particular less than or equal to 5 seconds. In step (1), the liquid solution is generally in the form of an aqueous or water/alcohol solution or in the form of a colloidal sol. More specifically, the liquid solution of step (1) is introduced into a reactor by nebulisation. Preferably, the total concentration of precursor(s) of the inorganic material(s) from which one wishes to form particles is greater than or equal to 0.5 mol/L in the solution, giving a concentration greater than or equal to 10 or 20% by weight with respect to the total weight of the solution. According to a particular embodiment, the total concentration of precursor(s) is between 0.5 and 3.0 mol/L (M).

Step (2) of heating (drying) is preferably carried out at a temperature of 150 to 400° C., preferably 200 to 400° C. (advantageously 300 to 400° C.), and/or preferably for a duration less than or equal to 10 seconds, in particular between 1 and 10 seconds.

Step (3), referred to as pyrolysis, is preferably carried out at a temperature of 400 to 700° C., and/or preferably for a duration less than or equal to 30 seconds, in particular between 10 and 30 seconds.

Step (4) of densification of the shells can be carried out over a wide range of temperatures, in particular between 200 and 1000° C. This step is preferably carried out at a temperature of 400 to 800° C., more particularly 500 to 700° C., in particular when the particles one wishes to prepare are completely or at least partly in crystallised form. Preferably, the step of densification is carried out for a duration less than or equal to 30 seconds, in particular between 20 and 30 seconds.

In this manner, in steps (2), (3) and (4), there is evaporation of the solvent, formation of particles saturated with precursor(s) on the periphery of the droplets, decomposition of the precursor in order to form the inorganic material with simultaneous complete precipitation and extraction of the solvent in order to form the shell of the hollow particles, and then densification of the shell of the particles, with these events following one another, but they may also overlap as the steps progress.

Step (5) of recovery is preferably carried out at a temperature of less than 100° C., and/or preferably for a duration less than or equal to 10 seconds, in particular less than or equal to 5 seconds. Step (5) of recovery of the particles is preferably carried out by depositing the particles on a filter at the outlet of the reactor.

The temperatures of each of the steps may be outside the temperature ranges specified above. Indeed, for the same particles, the temperature to be applied may depend on the speed at which the drops and then the particles circulate in the reactor. The more rapidly the particles circulate in the reactor, the less time they will spend there and the higher the set temperature must be to obtain the same result.

Preferably, steps (2), (3) and (4) are carried out in the same reactor. In particular, the series of steps of the method (except for the post-processing steps) is carried out in the same reactor.

The series of steps of the method, in particular steps (2), (3) and (4), is carried out continuously one after the other. The temperature profile applied in the reactor is adjusted based on the particles, and in particular the chemical nature of the particles, that one wishes to form so that these three steps will take place one after the other. The temperature in the reactor is preferably adjusted by means of at least one, and preferably three heating elements, the temperatures of which can be set independently.

Preferably, steps (2), (3), and optionally (4), are carried out at increasing temperatures.

According to a particular embodiment, the temperatures of step (4) are greater by least 200° C. than the decomposition temperature of the precursor(s). In particular, for metal nitrates such as magnesium nitrate that have a decomposition temperature of 300° C., the temperature of step 4 should be at least 500° C.

According to a particular embodiment of the invention, when particles of $Al_2O_3$ or $ZrO_2$, are prepared, as the decomposition temperature of the corresponding nitrate is 200° C., the temperature of step (4) is preferably at least 400° C. According to another particular embodiment of the invention, when MgO particles are prepared, the temperature of step (4) is preferably at least 500° C.-550° C. According to another particular embodiment of the invention, when ZnO particles are prepared, as the decomposition temperature of the corresponding nitrate is 350-380° C., the temperature of step (4) is preferably at least 550° C. and preferably 700° C.

As specified above, the method according to the invention does not require the presence of a blowing agent such as that described in particular in the patent FR 2973260.

The method according to the present invention preferably also comprises, between the step of densification (4) of the shells of the hollow particles and the step of recovery of the particles (5), a quenching step (4') of the particles. The quenching step (4') corresponds to a rapid decrease in temperature, in particular to return to ambient temperature (more particularly between 15 and 30° C.) in step (5). The quenching step advantageously corresponds to a decrease in temperature of at least 300° C./s, for example to reach a temperature ranging from 15 to 50° C. The quenching step (4') is preferably carried out via the entry of a cold gas, preferably air, in all or part of the circumference of the reactor. A gas is said to be cold in the present invention if it is at a temperature of 15 to 50° C., preferably 15 to 30° C. In a particular embodiment, the gas entering the reactor for this quenching step is a gas other than air. In particular, it can be an inert gas (such as nitrogen or argon), a reducing gas (such as hydrogen or carbon monoxide), or any mixture of such gases.

The method is preferably carried out in the absence of a gas flow that vectorises the fog from the beginning (e.g. the bottom) of the reactor. The laminar flow that allows the material to be moved to the area in which the temperature is highest is advantageously created only by aspiration at the end (e.g. top) of the reactor, resulting in a vacuum, for example on the order of several pascals to several dozen pascals.

Such an embodiment makes it possible to use a reactor without a gas inlet in its lower part, thus limiting disruption of the method and losses and optimising the yield of the method and the size distribution of the particles obtained.

In another embodiment, the reactor in which the method is carried out also comprises a gas inlet at the level where the fog is formed. The gas entering the reactor at this level should preferably be air.

Preferably, the method for preparing the particles according to the invention does not comprise any heating step other than those carried out inside the aerosol pyrolysis reactor.

Figure 1:
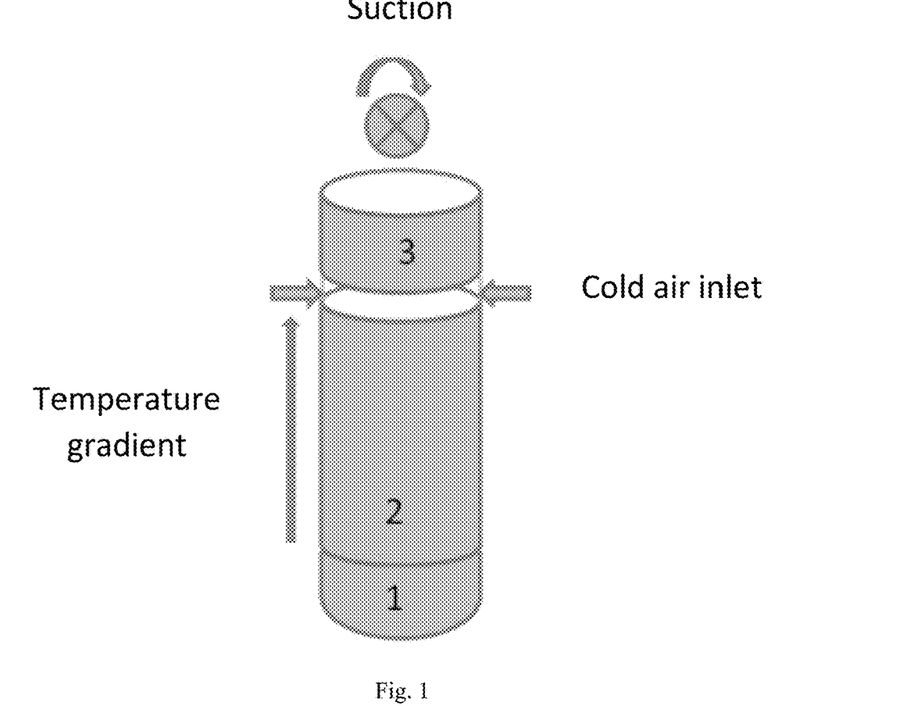
FIG. 1: Schematic view of a reactor adapted for the implementation of the method according to the invention.

FIG. 1 shows an example diagram of a reactor for carrying out the method according to the invention. The lower part (1) of the reactor comprises the liquid solution containing a precursor of the inorganic material(s) from which one wishes to form particles at a given molar concentration in a solvent. This solution is nebulised at the level of the intermediate part (2), and the droplets rise by aspiration in the reactor. The cold inlet gas, in particular cold air, allows quenching of the particles. The upper part (3) of the reactor is also at a cold temperature (less than 100° C., for example between 15 and 50° C.).

The precursor or precursors of the inorganic material(s) from which one wishes to form particles can be of any origin. It/they is/are added in step (1) of the method in the form of a liquid solution, in particular an aqueous or water-alcohol solution containing the metal ions (in the form of an organic or inorganic salt other than a chloride of the metal in question, for example a nitrate of the metal in question such as aluminum nitrate), and optionally the precursor molecules (for example, organosilanes such as tetraethylorthosilicate or alkoxides, for example an aluminium alkoxide such as aluminium isopropoxide), or in the form of a colloidal sol (such as a colloidal nanoparticle dispersion of the metal(s) or oxide(s) of the metal(s) in question). Preferably, the precursor or precursors of the inorganic material(s) is/are added in step (1) of the method in the form of a liquid solution, in particular an aqueous or water-alcohol solution containing the metal ions (such as an organic or mineral salt of the metal in question). Preferably, this is a nitrate of the metal in question. The precursor or precursors of the inorganic material(s) is/are selected based on the particles one wishes to form. In a particular embodiment, this precursor is at least partly derived from plant or food waste, which are biosources. As a particular example of such precursors of inorganic material, one can mention sodium silicate derived from rice husks. Slaughterhouse waste such as bones may serve as a source of calcium phosphate, blood can serve as a precursor of iron oxide and/or the shells of crustaceans can serve as a source of calcium carbonate.

According to a particular embodiment of the invention, the particles according to the invention are partly or completely composed of a metal component, optionally an organic/inorganic hybrid. This component can be obtained via the sol-gel route from at least one molecular metal precursor comprising one or a plurality of hydrolysable groups, optionally in the presence of a dispersant for the colloidal sols in order to favor the stability of the solution in step (1) of the method. If the particles obtained according to the method described above are hybrids (organic/inorganic), a post-processing step (i.e. after recovery of the particles) is advantageously carried out, and in particular, a step of heating the particles is carried out in order to make the particles completely inorganic.

The method according to the invention makes it possible to obtain particles having a high degree of purity. These particles do not necessarily require subsequent processing steps such as washing, thermal treatment, grinding, etc. prior to use.

In the method according to the invention, all of the materials added to the reactor are converted, which is an important advantage, as the method does not generate waste. Moreover, there is a high rate of atom utilisation, which meets the requirements of green chemistry.

The method according to the invention can comprise at least one particle post-processing step (i.e. after recovery of the particles). For example, this can be a washing step with a suitable solvent, a stage of heating the particles, and/or a step of coating the particles, in particular in order to seal them.

In particular, a step of post-processing by heating the particles can be necessary, in particular after recovery of the particles, in order to optimise the properties of the particles, such as their composition or their crystalline structure. A step of post-processing by heating the particles will generally be less necessary with decreasing speed of the drops and then the particles in the reactor.

The method according to the invention makes it possible to control the size and thus the thickness of the shells of the particles at the outlet of the process.

Another object of the invention is a set of particles capable of being prepared according to the method specified above, and in particular by carrying out the method comprising or composed of steps (1) through (5) as specified above. The particles thus prepared have the characteristics described above. This method makes it possible in particular to obtain hollow, spherical, and micrometric particles that have a low apparent density as described above and are advantageously individualised. Preferably, it also makes it possible to ensure that not every particle is composed of an aggregation of several particles of lesser size. The particles obtained by this method are preferably individualised and non-deformable.

Because of the speed of the method for preparing the particles and the possible inclusion of a quenching step at the end of the method for preparing the particles according to the invention, said particles may comprise any chemical component that can be densified, and in particular crystallised, including metastable phases. Indeed, the particular conditions used in the method make it possible to obtain components in densified form whose degradation temperature is less than the temperature actually used, because the time spent at a high temperature is extremely sort. In this contest, the term "high temperature" preferably refers to a temperature greater than 40° C. The "time spent at a high temperature" generally refers to the time elapsed for the steps of drying, pyrolysis and densification. Preferably, the time spent at a high temperature does not exceed 70 seconds, and in particular, it ranges from 30 to 70 seconds. Preferably, the quenching is characterised by a cooling rate greater than or equal to 100° C. or greater than 300° C. per second. In an embodiment, the particles according to the invention comprise a type of oxide that requires the addition of energy for densification, in particular for crystallisation. One can mention the examples of alumina, zinc oxide, and magnesium oxide, mullite or zirconium oxide, whether stabilised or not. Such particles cannot be obtained by the conventional processes used in the prior art, in particular those that do not include a quenching step.

A final object of the invention is a method for preparing a material according to the invention, comprising the bringing into contact of a matrix as described above with at least one set of particles according to the invention or capable of being obtained according to the method as described above. This method for preparing a material then preferably comprises a step of shaping of the material as described above.

Unless otherwise specified, the percentages mentioned in the present invention are percentages by weight.

The examples that follow are given in order to illustrate, but not limit, the invention.

EXAMPLES

In the examples that follow, LASER granulometry was carried out using the Mastersizer 2000 LASER granulometer (Malvern Instruments) by the wet method in water.

Example 1: Magnesium Oxide (MgO) Hollow Particles

Magnesium oxide (MgO) particles were prepared according to the following method. Dissolution of 20.4 g of magnesium nitrate hexahydrate in 79.6 g of demineralised water, giving a molar concentration of the precursor of 1.0 mol/L.

The precursor solution is nebulised by the spray pyrolysis method according to the invention.

The profile of the maximum temperatures reached in the reactor in which the steps of drying, pyrolysis and densification are carried out is as follows: 300° C., 400° C., 500° C., respectively, with the quenching step being carried out to return to ambient temperature before the recovery step.

Figure 3:
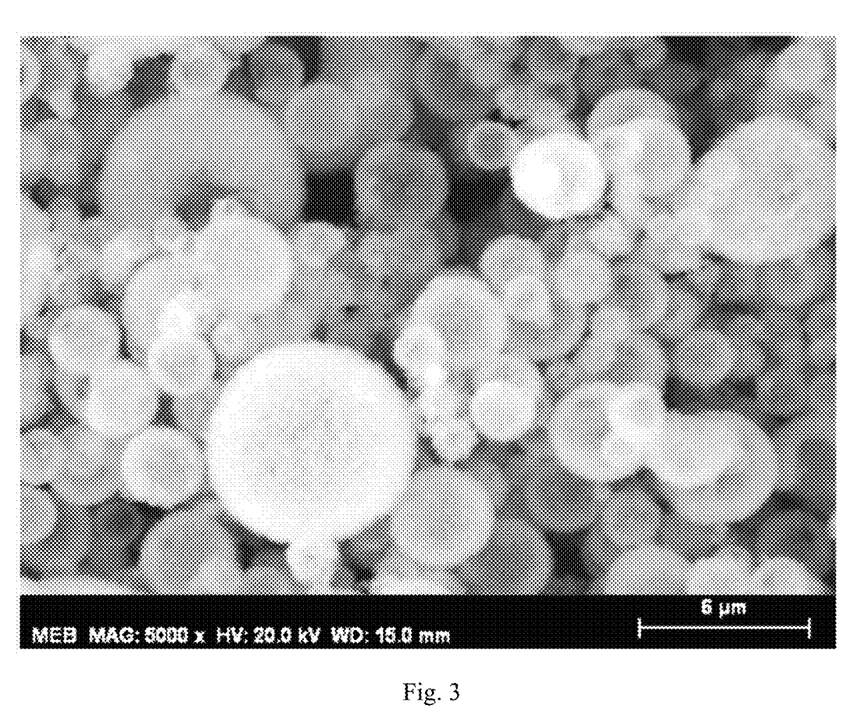
FIG. 3: Scanning electron micrograph of hollow particles of magnesium oxide according to the invention.

FIG. 3 shows scanning electron micrographs of the hollow magnesium oxide particles obtained, with an average diameter of 2.7 μm.

Example 2: Doped Zinc Oxide Hollow Particles

Doped zinc oxide ZnO:Al particles were prepared according to the following method. Dissolution of 25.8 g of zinc nitrate hexahydrate and 1.6 g of aluminium nitrate nonahydrate in 72.5 g of demineralised water, giving a total molar concentration of the precursor of 1.2 mol/L. The Zn/Al ratios can be monitored in order to achieve the desired doping ratio.

The precursor solution is nebulised by the spray pyrolysis method according to the invention.

The profile of the maximum temperatures reached in the reactor in which the steps of drying, pyrolysis and densification are carried out is as follows: 300° C., 500° C., 700° C., respectively, with the quenching step being carried out to return to ambient temperature before the recovery step.

Examples 3 and 4: Alumina $Al_2O_3$ Particles

Alumina $Al_2O_3$ particles were prepared according to the following method.

Dissolution of 27 g of aluminium nitrate nonahydrate in 73 g of demineralised water, giving a molar concentration of the precursor of 1.0 mol/L.

The precursor solution is nebulised by the spray pyrolysis method according to the invention.

The profile of the maximum temperatures reached in the reactor in which the steps of drying, pyrolysis and densification are carried out is as follows: 300° C., 500° C., 700° C., respectively, with the quenching step being carried out to return to ambient temperature before the recovery step.

For the $Al_2O_3$ particles of example 4, calcination (in post-processing) at 1200° C. allows crystallisation of the corundum powder (alpha alumina).

Example 5: Hollow Mullite Particles

Mullite particles ($3Al_2O_3$, $2SiO_2$) were prepared according to the following method with a total precursor concentration of 2.7 mol/L.
1. Dissolution of 5.3 g of aluminium nitrate nonahydrate in 70.8 g of demineralised water.
2. Addition of 16.6 g of aluminium alkoxide (aluminium isopropoxide) under agitation.
3. Addition of 7.3 g of silicon alkoxide (tetraethyl orthosilicate) under agitation.
4. After aging of the sol, heating for 2 hours at 80° C. in order to allow hydrolysis/condensation of the alkoxides and form the mullite sol.

The precursor solution is nebulised by the spray pyrolysis method according to the invention.

The profile of the maximum temperatures reached in the reactor in which the steps of drying, pyrolysis and densification are carried out is as follows: 300° C., 400° C., 500° C., respectively, with the quenching step being carried out to return to ambient temperature before the recovery step.

Figure 2:
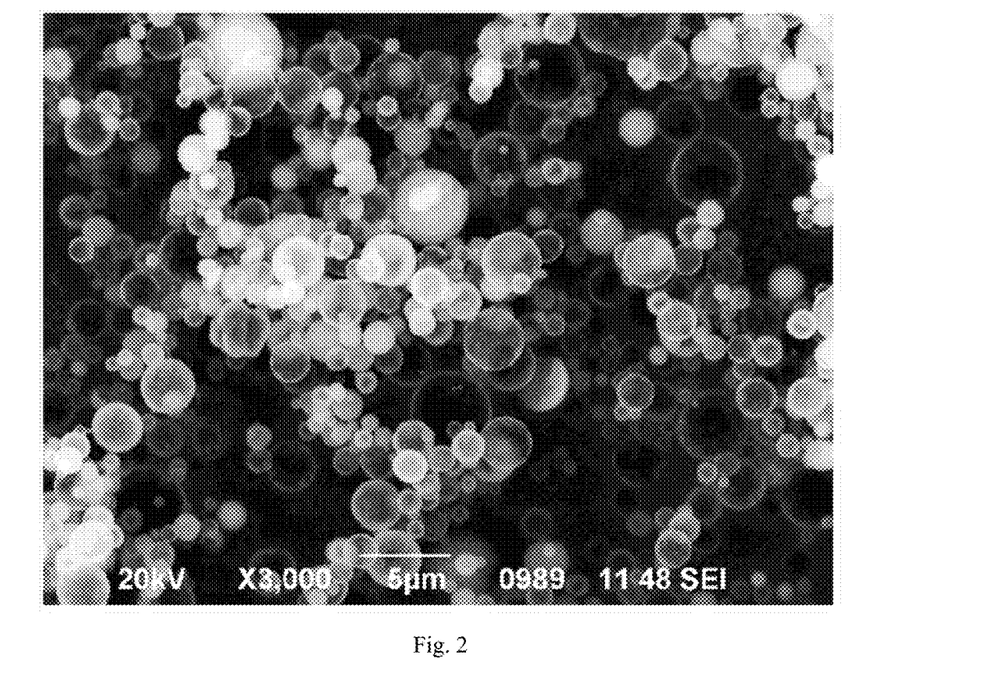
FIG. 2: Scanning electron micrograph of hollow particles of mullite according to the invention.

Calcination (in post-processing) at 1200° C. allows crystallisation of the mullite powder. FIG. 2 shows scanning electron micrographs of the hollow mullite particles obtained, with an average diameter of 1.5 μm.

Example 6: Hollow Zirconium Oxide $ZrO_2$ Particles

Zirconium oxide $ZrO_2$ particles were prepared according to the method of the invention. A precursor solution with a concentration of 0.6 mol/L of zirconium oxynitrate hydrate is nebulised by the spray pyrolysis method according to the invention.

The profile of the maximum temperatures reached in the reactor in which the steps of drying, pyrolysis and densification are carried out is as follows: 300° C., 400° C., 500°

C., respectively, with the quenching step being carried out to return to ambient temperature before the recovery step.

Example 7: Characteristics of the Particles

Granulometry and Sphericity

Table 1 below shows the granulometry characteristics of the particles obtained in examples 1-6 and calculation of sphericity by analysing scanning electron micrographs, approximating the shapes with 2D ellipses and calculating the circularity ratio.

TABLE 1

| Example | Name | Chemical/ crystallography formula | d10 | d50 | d90 | Average D | Sphericity |
|---------|------|-----------------------------------|-----|-----|-----|-----------|------------|
| 1 | Magnesium oxide | MgO cfc periclase | 1.1 | 1.7 | 3.3 | 2.7 | 0.98 ± 0.23 |
| 2 | Aluminum-doped zinc oxide | ZnO: 6.5% Al, hexagonal | 0.4 | 0.7 | 2.3 | 1.3 | 0.95 ± 0.16 |
| 3 | Alumina | $Al_2O_3$, amorphous | 0.8 | 1.1 | 2.3 | 1.2 | 0.95 ± 0.15 |
| 4 | Alumina | $Al_2O_3$, alpha | 0.9 | 1.5 | 3.5 | 1.9 | 0.96 ± 0.14 |
| 5 | Aluminium silicate | $3\ Al_2O_3, 2\ SiO_2$ | 0.7 | 1.4 | 3.7 | 1.5 | 0.85 ± 0.1 |
| 6 | Zirconium oxide | $ZrO_2$, quadratic | 0.4 | 0.6 | 1.1 | 0.4 | 0.93 ± 0.17 |

Apparent Density of the Powders

A 15 ml pillbox is weighed using a precision balance (to 0.001 g). Using a funnel, the powder is poured into the pillbox until it overflows and then flattened with a spatula at the level of the upper limit of the pillbox. The full pillbox is weighed. The unpacked apparent density $\rho_{bp}$ is calculated (=powder weight/volume).

The full pillbox is subjected to vibration for 20 min. After the vibration is stopped, the height of the empty portion of the pillbox is measured at 3 different places. The missing volume is calculated by taking the average of the 3 measurements. The packed apparent density $\rho_{bt}$ is calculated (=powder weight/volume after packing).

The Hausner index, which indicates the cohesion and flowability of the powder, was also calculated. The powders of the present invention have an H index=1.2, showing that they have favourable flowability.

Table 2 shows the density values obtained.

Preparation of Pellets for Characterisation of Porosity and Thermal Conductivity of the Particles In order to characterise porosity and thermal conductivity, powders composed of hollow spheres (or particles) according to the invention can be pressed in dry form. Another method consists of preparing a slurry by suspending the spherical powders in water by conventional mixing methods or by wet grinding.

Organic binders or dispersants can be added in order to facilitate suspension, control viscosity, or mechanically reinforce the pellets in "raw" form and improve the casting method.

The casting method consists of pouring a slurry into a plaster mould and drying until a dry pellet is obtained.

Isostatic pressing can also be selected, i.e. compacting the powder in dry form or containing a small amount of solvent under uniaxial pressure.

Hot pressing or pressing by spark plasma sintering can also be selected, and these methods are compatible with the invention and the spherical powders described in the present invention.

Porosity of the Pellets Obtained

The porosity of the sintered pellets is determined by water porosimetry at ambient temperature as described by Prevost in 2007 for the thermal barrier application (Prevost, Marie-Anne. Etude de nouvelles céramiques pour barrière ther-

TABLE 2

| Example | Name | Chemical/ crystallography formula | Unpacked (apparent) $\rho_{bp}$ (kg/m$^3$) | Packed $\rho_{bt}$ (kg/m$^3$) | Hausner index H = $\rho_{bt}/\rho_{bp}$ |
|---------|------|-----------------------------------|--------------------------------------------|-------------------------------|------------------------------------------|
| 1 | Magnesium oxide | MgO, cfc periclase | 139 ± 3 | 168 ± 2 | 1.2 |
| 2 | Aluminum-doped zinc oxide | ZnO: 6.5% Al, hexagonal | 206 ± 4 | 253 ± 4 | 1.2 |
| 3 | Alumina | $Al_2O_3$, amorphous | 239 ± 7 | 282 ± 8 | 1.2 |
| 4 | Alumina | $Al_2O_3$, alpha | 293 ± 9 | 355 ± 5 | 1.2 |
| 5 | Aluminium silicate | $3\ Al_2O_3, 2\ SiO_2$ | 474 ± 12 | 584 ± 11 | 1.2 |
| 6 | Zirconium oxide | $ZrO_2$, quadratic | 619 ± 8 | 763 ± 13 | 1.2 | mique (Study of new ceramics for thermal barrier). 2007. Doctoral thesis. Université Pierre and Marie Curie-Paris VI).

Thermal Conductivity

Thermal conductivity λ(T), given in $W \cdot m^{-1} \cdot K^{-1}$, relates to thermal diffusivity according to the following expression:

$$\lambda = \rho(T)C_p(T)D(T)$$

D(T) thermal diffusivity ($m^2/s$) at temperature T

ρ(T): apparent density ($kg/m^3$) at temperature T

Cp(T): specific heat at constant pressure ($J \cdot K^{-1} \cdot kg^{-1}$), calculated based on published data.

Thermal diffusivity was measured by the laser flash method.

The pellets were sintered at a temperature of 1400° C.

Table 3 below shows the results obtained for the alumina ($Al_2O_3$) materials of examples 3 and 4 and the mullite 3 $Al_2O_3$, 2 $SiO_2$ of example 5.

TABLE 3

|  |  | Unit | $Al_2O_3$ example 3 | $Al_2O_3$ example 4 | $3Al_2O_3$, $2SiO_2$ example 5 |
|---|---|---|---|---|---|
| Powder | Density | Kg/m³ | 239 | 293 | 139 |
|  | Thermal conductivity 20° C. | W/mK | — | 0.05 | — |
| Flash sintering | Porosity | % | 70-75% | 68%60-65% | −50-55% |
|  | Thermal conductivity 20° C. | W/mK | 0.4 | 1.34 | 0.13 |
|  | Thermal conductivity 500° C. | W/mK | 0.3 | 0.81.0 | −0.1 |
|  | Thermal conductivity 1000° C. | W/mK | 0.1 | 0.57 | −0.1 |

By way of comparison, and according to the same measurement methods, dense commercial $Al_2O_3$ particles show an apparent density of 600 $kg/m^3$. After sintering, the pellets produced from the particles show porosity of approximately 45%, thermal conductivity at 20° C. of approximately 4 W/mK, thermal conductivity at 500° C. of approximately 3 W/mK and thermal conductivity at 1000° C. of approximately 1 W/mK.

By way of comparison, and according to the same measurement methods, pellets produced from commercial mullite particles show porosity of less than 40% and thermal conductivity at 20° C., 500° C. and 1000° C. of approximately 0.7 W/mK.

The thermal conductivity of pellets comprising particles according to the invention is therefore much weaker than that of dense commercial powders.

Example 8: Incorporation of the Particles According to the Invention into a Polyethylene Foam Matrix It was possible to produce particles of zinc oxide (ZnO), mullite, magnesium oxide MgO, and aluminium oxide $Al_2O_3$ in this example.

The hollow particles according to the invention were incorporated into polyethylene by the standard techniques of die extrusion and granulation in order to prepare a master batch.

Case of Hollow Zinc Oxide ZnO Particles:

A foamed polyethylene was prepared by extrusion and addition of gas and calendered in the form of a film. The polyolefin grade is low-density polyethylene with approximately 1% hollow zinc oxide particles. The powders are incorporated in the form of master batches.

A gain of approximately +10% was obtained with respect to thermal conductivity and a reduction of approximately −10% was seen in the apparent density of the foam. The size of the bubbles was analyzed by optical microscopy, and the addition of hollow particles was found to decrease average bubble diameter.

Table 4 shows the results obtained.

TABLE 4

| Measurements | Units | Standard foam - | Standard foam with 1% hollow ZnO particles |
|---|---|---|---|
| Thermal conductivity | mW/mK | 40 | 33 |
| Foam density | kg/m³ | 20 | 17 |
| Emissivity | — | 0.2 | 0.2 |
| Transmittivity | — | 0.6 | 0.6 |

Example 9: Incorporation of Hollow MgO Particles into Enamel

Hollow magnesium oxide MgO particles according to the invention were dispersed in an enamel matrix in an aqueous slurry according to the follow protocol:

1. Pre-dispersion of the hollow particles in aqueous solution: the hollow particles are suspended in an aqueous solution. The proportion of hollow particles can vary between 10% and 60% by weight of solid matter. In the example, 40% by weight of the particles were tested on dry extract.

2. Pre-dispersion of the enamel powder in aqueous solution: the proportion of enamel powder can vary between 40% and 90% by weight of solid matter. In the example, 60% by weight of enamel was tested on dry extract.

3. The suspension of hollow particles is added under mechanical agitation to the enamel slurry. The final slurry can be composed of 30% to 60% by weight of solid matter and 40% to 70% by weight of aqueous solution. In the example, 40% by weight was tested.

The slurry obtained is deposited on a metal substrate by spraying or brushing. The substrate, coated with enamel, is dried in the air at about 100° C. and then baked at a high temperature between 500° C. and 900° C.

Thermal conductivity λ(T), given in $W \cdot m^{-1} \cdot K^{-1}$, relates to thermal diffusivity according to the following expression:

$$\lambda = \rho(T)C_p(T)D(T)$$

D(T) thermal diffusivity ($m^2/s$) at temperature T

ρ(T): apparent density ($kg/m^3$) at temperature T

Cp(T): specific heat at constant pressure ($J \cdot K^{-1} \cdot kg^{-1}$), calculated based on published data Thermal diffusivity was measured by the laser flash method on a steel plate coated with a layer of enamel, measured at 100 μm.

It was possible to calculate thermal conductivity λ based on measurement data for thermal diffusivity D on "steel+enamel" plates.

The specific heat capacity Cp is approximately that of steel (500 J/kg·K).

Table 5 shows the results obtained.

TABLE 5

| | Unit | Steel + 100% enamel | Steel + 60% enamel 40% hollow MgO particles according to the invention |
|---|---|---|---|
| Thermal diffusivity | $10^6$ m$^2$/s | 7.1 | 4 |
| Cp | J/kgK | 500 | 500 |
| Density | kg/m$^3$ | 7620 | 7600 |
| Thermal conductivity | W/mK | 27.2 | 15 |

The invention claimed is:

1. A thermally insulating material comprising inorganic particles and a matrix, wherein the inorganic particles are spherical, micrometric with an average diameter of from 0.1 to 10 micrometers, hollow and have an apparent density of from 100 to 700 kg/m$^3$, and wherein said particles are obtained by a process by aerosol pyrolysis carried out at drying temperature and without adding a blowing agent, and wherein the inorganic particles comprise at least one dopant.

2. The material of claim 1, wherein the inorganic particles comprise MgO, ZnO or ZrO$_2$, optionally stabilized with rare earths, mullite (SiO$_2$—Al$_2$O$_3$), alumina, or mixtures thereof.

3. The material of claim 1, wherein the inorganic particles are mullite particles.

4. The material of claim 1, wherein the matrix is a solid matrix, said matrix comprising ceramics, fibers, foams, enamel or a mixture thereof.

5. The material of claim 1, wherein said process comprises the steps of:
   a) nebulizing a liquid solution containing a precursor of an inorganic material from which to form particles at a molar concentration greater than or equal to 03 mol/L in the liquid solution, thereby obtaining a fog of solution droplets;
   b) heating the fog obtained at a temperature sufficient to evaporate a solvent for the liquid solution in order to increase a precursor concentration of the inorganic material on a periphery of the droplets, thereby forming particles;
   c) heating the particles obtained in step b) at a temperature sufficient to decompose the precursor in order to form the inorganic material with simultaneous complete precipitation and extraction of the solvent in order to form a shell of hollow particles;
   d) densifying the shell of the obtained particles;
   e) optionally, quenching the particles obtained; and
   f) recovering the particles formed.

6. A thermally insulating material for construction, comprising a matrix and inorganic particles, and optionally a fibrous reinforcing material wherein the matrix is an enamel matrix, and said inorganic particles comprise spherical particles which are micrometric having an average diameter of from 0.1 to 10 micrometers, hollow, and have an apparent density of from 100 to 700 kg/m$^3$, and wherein said particles are obtained by a process by aerosol pyrolysis carried out at drying temperature and without adding a blowing agent.

7. A process for preparing inorganic particles by aerosol pyrolysis, comprising, without adding a blowing agent, the steps of:
   a) nebulizing a liquid solution containing a precursor of an inorganic material from which to form particles at a molar concentration greater than or equal to 0.5 mol/L in the liquid solution, thereby obtaining a fog of solution droplets;
   b) heating the fog obtained at a temperature sufficient to evaporate a solvent for the liquid solution in order to increase a precursor concentration of the inorganic material on a periphery of the droplets, thereby forming particles;
   c) heating the particles obtained in step b) at a temperature sufficient to decompose the precursor in order to form the inorganic material with simultaneous complete precipitation and extraction of the solvent in order to form a shell of hollow particles,
   d) densifying the shell of the obtained particles;
   e) optionally, quenching the particles obtained; and
   f) recovering the particles formed.

8. The process of claim 7, wherein said nebulizing step a) is carried out at a temperature of from 10 to 40° C., and for a duration of less than or equal to 10 seconds.

9. The process of claim 7, wherein said heating step b) is carried out at a temperature of from 150 to 400° C., and for a duration of less than or equal to 10 seconds.

10. The process of claim 7, wherein said heating step c) is carried out at a temperature of from 400 to 700° C., and for a duration of less than or equal to 30 seconds.

11. The process of claim 7, wherein said densification step d) is carried out at a temperature of from 200 to 1,000° C., and for a duration of less than 30 seconds.

12. The process of claim 7, wherein said recovery step f) is carried out at a temperature of less than 100° C., and for a duration of less than 10 seconds.

13. A process for preparing the thermally insulating material of claim 6, comprising contacting said matrix with said inorganic particles.

* * * * *